(12) United States Patent
Alexander

(10) Patent No.: US 12,084,375 B2
(45) Date of Patent: Sep. 10, 2024

(54) ROTARY BATCH AND CULLET PREHEATER SYSTEM AND METHOD

(71) Applicant: Jeffrey C. Alexander, Newbury, MA (US)

(72) Inventor: Jeffrey C. Alexander, Newbury, MA (US)

(*) Notice: Subject to any disclaimer, the term of this patent is extended or adjusted under 35 U.S.C. 154(b) by 0 days.

(21) Appl. No.: 17/880,256

(22) Filed: Aug. 3, 2022

(65) Prior Publication Data

US 2023/0038523 A1 Feb. 9, 2023

Related U.S. Application Data

(60) Provisional application No. 63/230,146, filed on Aug. 6, 2021.

(51) Int. Cl.
C03B 3/02 (2006.01)
C03B 1/00 (2006.01)

(52) U.S. Cl.
CPC ............... *C03B 3/023* (2013.01); *C03B 1/00* (2013.01)

(58) Field of Classification Search
CPC ............................... C03B 3/023; C03B 5/237
See application file for complete search history.

(56) References Cited

U.S. PATENT DOCUMENTS

| | | |
|---|---|---|
| 2,715,517 A | 8/1955 | Bojner |
| 3,545,988 A | 12/1970 | Slade |
| 4,184,861 A | 1/1980 | Erickson et al. |
| 4,225,332 A | 9/1980 | Tsay |
| 4,248,616 A | 2/1981 | Seng et al. |

(Continued)

FOREIGN PATENT DOCUMENTS

| | | |
|---|---|---|
| CN | 207405066 U | 5/2018 |
| CN | 209428388 U | 9/2019 |

(Continued)

OTHER PUBLICATIONS

WO-2021148599-A1 (Deigat) Jul. 29, 2021 (English language machine translation). [online] [retrieved Jul. 25, 2023]. Retrieved from: Espacenet. (Year: 2021).*

(Continued)

*Primary Examiner* — Erin Snelting
(74) *Attorney, Agent, or Firm* — NIELDS, LEMACK & FRAME, LLC

(57) ABSTRACT

Method of producing molten glass and system therefor, including providing a glass melting furnace configured to melt a glass sample, the glass sample including glass batch material including soda ash, or cullet or post-consumer cullet, or any combination of batch material, cullet and post-consumer cullet. The method includes introducing glass sample into a chamber of a rotary drum heat exchanger having at least one heat exchange tube; introducing the exhaust gas into the tube; causing a transfer of heat from the exhaust gas in the tube to the glass sample in the chamber to volatilize any organic impurities in the glass sample, heat the glass sample and evaporate water from the glass sample to dry it, the evaporated water forming water vapor in the chamber; contacting the dried sample with the water vapor; and discharging the dried sample from the rotary drum heat exchanger and introducing it into the furnace.

16 Claims, 9 Drawing Sheets

(56) References Cited

U.S. PATENT DOCUMENTS

| | | | |
|---|---|---|---|
| 4,303,434 | A | 12/1981 | Rough, Sr. et al. |
| 4,350,512 | A | 9/1982 | Krumwiede |
| 4,353,726 | A | 10/1982 | Rough, Sr. |
| 4,410,347 | A | 10/1983 | Krumwiede |
| 4,684,342 | A | 8/1987 | Harcuba |
| 4,696,690 | A | 9/1987 | Roloff |
| 4,797,092 | A | 1/1989 | Pieper |
| 4,913,069 | A | 4/1990 | Schultz et al. |
| 5,123,942 | A | 6/1992 | Argent et al. |
| 5,125,943 | A | 6/1992 | Cole |
| 5,290,334 | A | 3/1994 | Alexander |
| 5,342,427 | A | 8/1994 | Alexander |
| 5,399,181 | A | 3/1995 | Sorg |
| 5,529,762 | A | 6/1996 | Alexander |
| 5,556,443 | A | 9/1996 | Alexander |
| 5,578,102 | A | 11/1996 | Alexander |
| 5,603,910 | A | 2/1997 | Alexander |
| 5,741,342 | A | 4/1998 | Alexander |
| 5,759,507 | A | 6/1998 | Delling et al. |
| 5,773,529 | A | 6/1998 | Alexander |
| 5,779,748 | A | 7/1998 | Alexander |
| 5,855,636 | A | 1/1999 | Alexander |
| 5,954,851 | A | 9/1999 | Sakae |
| 6,615,612 | B2 | 9/2003 | Alexander |
| 8,099,981 | B2 | 1/2012 | Barklage et al. |
| RE46,896 | E | 6/2018 | Charbonneau |
| 2007/0227191 | A1 | 10/2007 | Kobayashi et al. |
| 2010/0279242 | A1 | 11/2010 | Barklage et al. |
| 2013/0199240 | A1 | 8/2013 | Lindig et al. |
| 2016/0023936 | A1 | 1/2016 | Lindig et al. |
| 2017/0121206 | A1* | 5/2017 | Kobayashi ............ C03B 5/2353 |
| 2018/0029915 | A1 | 2/2018 | Huber |
| 2023/0040599 | A1 | 2/2023 | Alexander |
| 2023/0278904 | A1 | 9/2023 | Alexander |

FOREIGN PATENT DOCUMENTS

| | | |
|---|---|---|
| CN | 113173689 A | 7/2021 |
| WO | WO-2021148599 A1 * | 7/2021 |

OTHER PUBLICATIONS

US Department of Energy, Energy Efficiency and Renewable Energy, Industrial Technologies Program, "Electrostatic Batch Preheater System: New System Uses Furnace Exhaust to Preheat Batch and Cullet and Abate Emissions in Glass Melting", Mar. 2007, 2 pages.

The American Ceramic Society, A Collection of Papers Presented at the 61st Conference on Glass Problems: Ceramic Engineering and Science Proceedings, vol. 22, Issue 1, copyright 2001, published online Mar. 26, 2008, edited by Charles H. Drummond, Chapter 4 "Electrostatic Batch Preheating Technology: E-Batch", pp. 37-53, by Jeffrey C. Alexander.

Leone Industries: Experience with Cullet Filter/Preheater, Glass Problems Conference Presentation, Oct. 30, 2006, pp. 1-8, by Larry Barrickman & Peter Leone.

Office action mailed Mar. 20, 2015 in co-pending U.S. Appl. No. 14/025,055.

Final Rejection mailed Oct. 28, 2015 in co-pending U.S. Appl. No. 14/025,055.

Office action mailed May 1, 2015 in co-pending U.S. Appl. No. 14/025,070.

Office action mailed Aug. 10, 2015 in co-pending U.S. Appl. No. 14/025,070.

European communication dated Apr. 4, 2023 in corresponding European patent application No. 22188676.5.

European communication dated Dec. 20, 2022 in co-pending European patent application No. 22188675.7.

European communication dated Dec. 20, 2022 in corresponding European patent application No. 22188676.5.

European communication dated Aug. 7, 2023 in co-pending European patent application No. 23158942.5.

* cited by examiner

SECTION A-A

LOOP 1
INLET GAS TEMPERATURE

LOOP 2
INLET GAS FLOW RATE

ROTARY BATCH AND CULLET PREHEATER SYSTEM AND METHOD

This application claims priority of U.S. provisional application Ser. No. 63/230,146 filed on Aug. 6, 2021, the disclosure of which is hereby incorporated by reference.

BACKGROUND

1. Field

Embodiments disclosed herein relate to a method for preheating raw materials for glass manufacture using waste heat from the glass melting process.

Glass is made by heating and melting a mixture of solid raw materials to a liquid state. The melting is done inside of a furnace and necessarily requires substantial amounts of heat. Typically, this heat is generated by the combustion of fossil fuels and the exhaust gases from the combustion leave the furnace. Exhaust gas temperatures immediately after the furnace are quite high, typically 1350-1450° C. In some cases, combustion air preheaters are included which recover some of the heat in these gases. Even so, gas temperatures at the discharge to atmosphere are quite high, thus substantial amounts of heat are wasted. The cost of fuel for heating the furnace is a major component in the cost of making glass.

The raw materials for glass are typically referred to as batch and cullet. The word batch generally refers to an assemblage of various pulverous materials including silica sand, limestone, soda ash, salt cake, and a variety of other minor ingredients. The material and mixture ratios are carefully chosen to produce glass of the desired properties and quality. Generally, these materials are prepared in a finely divided form to promote their melting rates. Sizes are typically 100 to 200 µm diameter with a maximum size of 1 mm.

The word cullet generally refers to recycled glass, either from the factory or from external sources. Cullet from the factory is typically less than 10% of the production rate of the furnace and is generated by product breakage, or product rejected due to defects. Factory cullet is gathered from the various sources in the plant, crushed to sizes less than 100 mm and collected in a central storage hopper.

Cullet from external sources, referred to as Post-Consumer Recycle (PCR) cullet generally comes from glass bottle recycling programs in the community. The amount of PCR cullet in each furnace can vary widely, from as little as 0% of production rate up to 80%. PCR cullet is generally laden with impurities such as organic residues, paper, plastics, and other non-glass materials deposited into recycling containers. PCR cullet is delivered to the glass factory by truck or rail carriers from the recycling centers. PCR cullet is normally delivered in a coarse crushed form of size less than 100 mm.

The batch, factory cullet and PCR cullet are typically blended before introduction to the melting furnace.

The embodiments disclosed herein can be advantageously used to preheat the batch and the cullet using heat from the exhaust gases and result in an improved glass melting process. By preheating these materials before they are introduced to the furnace, the amount of fuel required for heating and melting them can be reduced. This fuel reduction can represent a substantial economic benefit to the glass making process and reduces the emission of harmful gases (such as NOx and $CO_2$) simply because less fuel is burned.

Fossil fuel fired glass furnaces are of several different designs. When air is combusted with fuel, the air is typically preheated in regenerative or recuperative heat exchangers to preheat the combustion air utilising some of the waste heat exiting the furnace. When nominally pure oxygen is used for combustion, no waste heat recovery equipment is typically involved. Such furnaces are termed oxyfuel fired.

While the embodiments disclosed herein could be advantageously applied to any of the glass production schemes, its benefits are greatest in the case of oxyfuel fired furnaces. This is because exhaust gas temperatures are higher, thus batch and cullet can be preheated to high temperatures, and because reduction in fuel requirements for the furnace is accompanied by a proportional reduction in the oxygen supply (and thus cost) for the furnace.

2. Description of Prior Art

Many different technologies for batch and cullet preheating have been proposed in the past. Reference is made to "Method and Device for Preheating Raw Materials for Glass Production, Particularly A Cullet Mixture", U.S. Pat. No. 4,696,690. In this device, furnace exhaust gases are passed through "flow ducts" inside of a bunker. The upper half of the flow ducts are formed by equal sided angle sections arranged to form a roof like structure inside the bunker. The angles provide an open bottom and the cullet mixture (batch and cullet mixed) itself forms the bottom half of the flow duct, due to its angle of repose under the roof.

The cullet mixture is introduced to the bunker through its open top. The cullet mixture is moved downward by gravity, thus providing continuously renewed surfaces in the flow ducts that are exposed to the furnace exhaust gases. Heat is transferred to the cullet mixture primarily because of the direct contact with the hot gases.

The flow ducts are arranged in horizontal rows, with the furnace gas divided to flow through the ducts of a given row in parallel. Multiple rows of flow ducts are provided one above another with internal tunnels to direct the flow successively from the lower banks to the upper banks. The result is to achieve a countercurrent flow of hot gases with the downward moving cullet mixture in the bunker. The cullet mixture is fed out of the device through a nozzle as controlled by a conventional device such as a vibratory, screw, or other mechanical type feeder.

Such devices have been successfully operated but have found only limited applicability in the glass industry. Preheating of the cullet mixture and reduced fuel consumption of the furnace has been well demonstrated. As well, partial removal of $SO_2$, HCl, and HF has been realised. However, several operational limitations to the device have been observed:

1. Excessive amounts of dust from the batch material are entrained in the furnace gases flowing through the flow ducts and carried out of the unit with the exhaust gases.
2. Formation of agglomerates of the cullet mixture inside the device. These agglomerates block the proper flow of material and render the device inoperable.
3. To minimize the negative effects of agglomerate formation, the flow ducts are widely spaced. As a result, the equipment is large, heavy, and expensive to install.
4. To break up the agglomerates, the device is constrained to operate with cullet mixtures that have a high cullet to batch ratio.

Alexander teaches "Method and Apparatus which Removes Odor and Pollutants when Preparing Cullet for Use in and Electrostatic Bed Filter", U.S. Pat. No. 5,773,529. Here hot furnace exhaust gases are directly contacted with Post-Consumer Recycled cullet in a direct contact moving bed and the exiting gases carry away volatilized organic impurities. These exiting gases are then blended with furnace exhaust gases to oxidize these odor-causing impurities. As alluded to in the patent, this process is limited because the entire volume of gases exiting the direct contact moving bed are laden with volatilized organic matter and must be incinerated. In most glass furnace cases; the mass flow of these return gases will be about the same as the mass flow of the gases exiting the furnace. Then the blended temperature becomes less than 800° C. and too low to achieve the desired oxidation.

Slade teaches "Glass Manufacturing Method", U.S. Pat. No. 3,545,988. In this device, the sand and light soda ash for use in batch is pre-treated to form free flowing agglomerates that are substantially dust free. The agglomerates are formed because the light soda ash (sodium carbonate anhydrous) is converted to sodium carbonate monohydrate as a tightly adhering coating on the sand grains. The treated sand and soda ash is then mixed with the rest of raw materials before delivery to the glass melting furnace. The result is a batch that can be easily handled without dusting either inside or outside the furnace with substantially improved furnace performance. However, the process described to achieve said agglomerates is complex and expensive, so has found limited use in the industry.

Bojner teaches "Rotary, Tubular Heat Exchanger", U.S. Pat. No. 2,715,517, the disclosure of which is hereby incorporated by reference, which is like the instant device but has not been used for heating glass batch. In the device, wet granular material is fed into the interior of a rotating drum at one end. The drum is configured with a plurality of tubes supported at the end plates of the drum. Holes in the end plates and plenums allow hot gases to flow through the inside of the tubes. Heat is transferred from the hot gases to the material through the tube walls. As the wet material progresses along the length of the drum, the material is dried and then heated. Hot material is discharged from the outlet end of the drum.

The subject of the present disclosure is the integration of this machine, configured to heat a mixture of batch and cullet, into the glass furnace process so that organic impurities in the cullet are not discharged to the atmosphere.

SUMMARY

In view of the foregoing, the following are certain objects or benefits of the described embodiments.

In some embodiments, disclosed is a method of producing molten glass, comprising:

providing a glass melting furnace configured to melt, by burning fossil fuel, a glass sample, the glass sample comprising glass batch material comprising soda ash, or cullet or post-consumer cullet, or any combination of batch material comprising soda ash, cullet and post-consumer cullet, said melting producing exhaust gas;

introducing glass sample into a chamber of a rotary drum heat exchanger having at least one heat exchange tube;

introducing said exhaust gas into said at least one heat exchange tube;

causing a transfer of heat from said exhaust gas in said at least one heat exchange tube to said glass sample in said chamber to volatilize any organic impurities in said glass sample, heat said glass sample and evaporate water from said glass sample to dry said glass sample, said evaporated water forming water vapor in said chamber;

contacting the dried sample with said water vapor; and discharging the dried sample from said rotary drum heat exchanger and introducing it into said glass melting furnace.

In some embodiments, the method further comprises combining said water vapor and any volatized organic impurities with said exhaust gas.

In some embodiments, the glass sample may include glass batch material alone, cullet alone, post-consumer cullet alone, or any combination thereof.

In some embodiments, contacting the dried sample comprising glass batch material having soda ash with the water vapor (e.g., the humidity in the chamber atmosphere) causes the soda ash in the glass batch material to form sodium carbonate monohydrate. In some embodiments, the transfer of heat from the exhaust gas to the glass batch material is sufficient to dehydrate the sodium carbonate monohydrate.

In some embodiments, the transfer of heat raises the temperature of the glass sample to above 109° C.

In some embodiments, such as where the glass sample comprises post-consumer cullet, volatile organic components produced upon heating the post-consumer cullet may be vented to a flue channel or the like. In some embodiments, some or all of the volatile organic components may be combined with glass furnace exhaust gas and used as the inlet gas to the heat exchange tube(s).

In some embodiments, the method may further comprise extracting a portion of gas in the chamber and mixing it with the exhaust gas.

In some embodiments, a portion of gas in the chamber may be vented to atmosphere, and/or oxidized in a regenerative oxidizer.

In some embodiments, a process to transfer heat from glass furnace exhaust gases to a mixture of batch, factory cullet and Post Consumer Recycle (PCR) cullet prior to their introduction to the glass melting furnace comprises one or more of the following steps:

1) Providing a glass melting furnace.
2) Combusting a fossil fuel such as natural gas or oil mixed with oxygen or air inside the furnace and producing exhaust gases comprised of the products of combustion.
3) Discharging said exhaust gases from the furnace through a port and into a flue chamber.
4) Introducing the mixture into the inside of a rotating drum, the drum fitted with end plates and tubes extending between the end plates, the end plates including holes adjacent to each tube end with tubes fitted and sealed to the holes.
5) Passing said hot furnace exhaust gases from the flue chamber through the inside of said tubes, said hot furnace gases specifically not directly contacted with said mixture.
6) Said mixture contacting the outside of said tubes.
7) Transferring heat from the hot gases, through the walls of the tubes and into the mixture.
8) Evaporating water from the mixture, said water being transformed into water vapor which occupies the interior of the drum.
9) Contacting soda ash in the resulting dry batch with the water vapor inside the drum.
10) Reacting said water vapor with the dry soda ash portion of the batch to form sodium carbonate monohydrate.
11) Volatilizing organic impurities from the PCR cullet, said volatilized organic material being transformed into fumes and aerosols which occupy the interior of the drum.

12) Discharging the resulting heated mixture from said drum, said mixture being substantially free of organic impurities.
13) Feeding said heated mixture into the glass melting furnace.
14) Venting the water vapor, organic fumes and aerosols from the interior of the drum.
15) Blending the vented water vapor, organic fumes and aerosols with furnace exhaust gases in a flue channel.
16) Oxidizing said organic fumes and aerosols in said flue channel.

In some embodiments, soda ash is a constituent of the batch, the soda ash is contacted with water vapor inside the drum and reacts to form sodium carbonate monohydrate, which is then dehydrated by heating it to a temperature above 109° C.

In some embodiments, the glass sample comprises Post-consumer recycle cullet, and it is crushed so that no piece of cullet has a dimension greater than 25 mm. This allows the spacing between the plurality of tubes in the drum to be less than 50 mm (each of the plurality of tubes is preferably arranged in parallel with respect to their respective longitudinal axes).

In some embodiments, the glass sample comprises Post-consumer recycle cullet, and it is crushed so that no piece of cullet has a dimension greater than 15 mm. This allows the spacing between the plurality of tubes in the drum to be less than 30 mm (each of the plurality of tubes is preferably arranged in parallel with respect to their respective longitudinal axes).

In some embodiments, the mass flow rate of water vapor, organic fumes and aerosols, where present, is less than 20% of the mass flow rate of the furnace exhaust gases. In some embodiments, the temperature of gases in the drum atmosphere, e.g., blended exhaust gases, water vapor, and any organic fumes and aerosols, is greater than 900° C., and the oxygen content of the blended exhaust gases, water vapor, and any organic fumes and aerosols is greater than 2%.

In some embodiments, the glass sample comprising post-consumer cullet in the drum is heated to a temperature greater than 300° C. so that the heated mixture fed to the glass melting furnace is free or substantially free of organic impurities.

In some embodiments, there is a flue channel that receives furnace exhaust gases and vented water vapor, organic fumes and aerosols at its inlet end, the furnace exhaust gases and vented fumes and aerosols are blended in the flue channel, the blended gases are discharged from the flue channel and directed to the inlet of the rotating drum; gases are drawn from the rotating drum by a driving force such as a fan and are discharged to atmosphere.

In some embodiments, there is a regenerative heat exchanger that receives furnace exhaust gases and vented water vapor, organic fumes and aerosols at its inlet end, the furnace exhaust gases and vented fumes and aerosols are blended in the regenerative heat exchanger, the blended gases are discharged from the regenerative heat exchanger and directed to the inlet of the rotating drum; gases are drawn from the rotating drum by a driving force such as a fan, and are discharged to atmosphere.

In some embodiments, the vented fumes and aerosols are directed to flow into the combustion space of the glass melting furnace.

In some embodiments, a valve controls the amount of the gases that are directed by the fan or other driving force to blend with gases discharged from the flue channel, the fan speed is controlled to achieve a set point of gas flow drawn from the rotating drum, and the valve position is controlled to achieve a set point of temperature for gases inlet to the rotating drum.

In some embodiments, a method to produce molten glass comprises the following steps:
a. Providing a glass melting furnace.
b. Combusting natural gas or oil with oxygen or air inside the furnace and producing exhaust gases comprised of the products of combustion.
c. Discharging said exhaust gases from the furnace through a port.
d. Introducing a mixture of batch and cullet and/or PCR into the inside of a rotating drum.
e. Crushing said cullet so that no piece of cullet has a dimension greater than 25 mm.
f. Providing spacing between said tubes to be less than 50 mm.
g. Said drum being fitted with end plates and tubes extending between the end plates, end plates including holes adjacent to each tube end with tubes fitted and sealed to the holes.
h. Passing said hot furnace exhaust gases through the inside of said tubes.
i. Said mixture contacting the outside of said tubes.
j. Transferring heat from said hot gases, through the tube walls and into the mixture, thereby heating said mixture in the drum.
k. Discharging said heated mixture from said drum.
l. Feeding said heated mixture into the glass melting furnace.

In some embodiments, the method further comprises delivering the batch and cullet mixture to a storage hopper positioned at the inlet to the drum; providing a secondary crusher that receives the batch and cullet mixture continuously from the storage hopper and delivers the batch and cullet mixture continuously to the drum, wherein the secondary crusher is designed to further reduce the maximum cullet size. In some embodiments, the cullet is crushed so that no piece of cullet has dimension greater that 10 cm and the spacing between tubes in the drum is less that 30 cm.

In some embodiments, disclosed is a system for melting glass, comprising:
a glass melting furnace configured to melt, by burning fossil fuel, glass sample, the glass sample comprising glass batch material comprising soda ash, or cullet or post-consumer cullet, or any combination of batch material comprising soda ash, cullet and post-consumer cullet, said melting producing exhaust gas;
a rotary drum heat exchanger having a chamber containing said glass sample and at least one heat exchange tube in said chamber having a gas outlet, said at least one heat exchange tube being in fluid communication with said exhaust gas so as to transfer heat from said exhaust gas in said at least one heat exchange tube to said glass sample in said chamber to volatilize any organic impurities in said glass sample, heat said glass sample and evaporate water from said glass sample to dry said glass sample, said evaporated water forming water vapor in said chamber, said chamber being in communication with said glass melting furnace for introduction of the dried glass sample into said glass melting furnace; and
a controller in communication with a temperature sensor configured to sense the temperature of said exhaust gas and with a valve positioned to regulate the amount of gas from said gas outlet of said at least one heat exchange tube that is combined with said exhaust gas prior to said exhaust gas being introduced into said at least one heat exchange tube, said controller configured to actuate said valve in response to said sensed temperature.

In some embodiments, the controller is in communication with a flow volume sensor positioned to sense the flow volume of said exhaust gas prior to said exhaust gas being introduced into said at least one heat exchange tube, and with a driving force for driving the flow of said gas from said gas outlet of said at least one heat exchange tube, said controller configured to control the speed of said driving force in response to the sensed flow volume.

In some embodiments, the driving force comprises a fan with a variable speed motor, and wherein the controller controls the speed of the motor.

In some embodiments the controller receives a pre-determined temperature set point and actuates the valve such that the sensed temperature reaches the pre-determined set point.

BRIEF DESCRIPTION OF THE DRAWINGS

The above and other aspects of the present invention will now be described in further detail, by way of example only, with reference to the accompanying drawings, in which.

DETAILED DESCRIPTION

Figure 1:
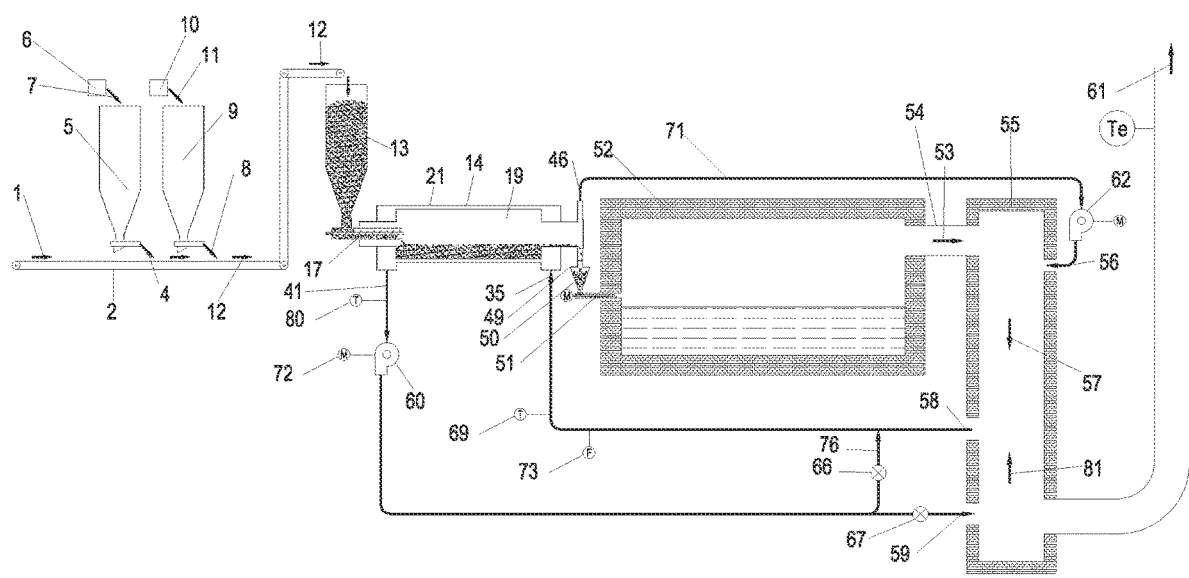
FIG. 1 is a flow diagram of the method for producing melted glass using the batch and cullet preheater as applied to an oxy-fuel fired furnace.

Embodiments disclosed herein concern themselves with the manufacture of soda-lime glass, the most common glass type manufactured. At a glass factory, a variety of raw materials are mixed and then melted in the furnace. The principal ingredients in the manufacture of soda-lime glass are silica sand ($SiO_2$), limestone (calcium carbonate, $CaCO_3$), and soda ash (sodium carbonate, $Na_2CO_3$). In addition, a variety of minor ingredients can be added to promote special properties, including sodium sulfate ($Na_2SO_4$), carbon (C), gypsum ($CaSO_4$), aluminum oxide ($Al_2O_3$), selenium (Se), cerium, cobalt oxide, and others.

Most glass manufacturing operations assure that batch includes about 3-4% water when introduced to the furnace. If water is not naturally occurring as a contaminant in the raw materials, glass manufacturing operations will add water to the batch. Water in the batch will reduce dusting during material handling and prevent segregation of the various batch constituents during handling and charging of the furnace.

Soda ash will typically comprise 15% to 18% of the total batch mass, with ranges as wide as 12% to 20%. Soda ash is water soluble, hygroscopic, and will form a variety of hydrated forms when contacted with water. When soda ash is mixed with the water some of the soda ash dissolves into the liquid water.

When sodium carbonate anhydrous (SCA) is contacted with water, various hydrates can be formed, specifically sodium carbonate monohydrate (SCM), $Na_2CO_3 \cdot H_2O$, sodium carbonate heptahydrate (SCH), $Na_2CO_3 \cdot 7H_2O$, and sodium carbonate decahydrate (SCD), $Na_2CO_3 \cdot 10H_2O$. When initially contacted with water at room temperature, SCA will dissolve into the water to its saturation concentration of about 32 g/100 ml. This dissolution is exothermic and heats batch material, normally to temperature above 40° C.

When subsequently heated, as in a batch and cullet preheater, the water will be evaporated and leave behind the SCA solute as a residue. Embodiments disclosed herein take advantage of several features regarding soda ash/water physicochemical properties, including some or all of the following:

1) Soda ash readily dissolves into water. Saturation concentration is between 31 and 34.5 g/100 ml depending upon temperature. The dissolution process is exothermic.
2) Sodium carbonate is hygroscopic. When anhydrous sodium carbonate is exposed to air at temperature above 34.5° C. and with relative humidity greater than 72%, water vapor will be reacted with the sodium carbonate to form sodium carbonate monohydrate. This process is exothermic.
3) Sodium carbonate monohydrate (SCM) is a stable solid between temperatures of 34.5° C. and 109° C.
4) SCM thermally decomposes to sodium carbonate and water vapor at temperature above 109° C. The water does not go through a liquid phase. This process is endothermic.
5) SCM contains 85.48% $Na_2CO_3$ and 14.52% $H_2O$ by weight.

Taking batch with 18% soda ash as an example, stoichiometric conversion of all the soda ash to SCM would consume batch water of 3.1%. Thus, if this batch were made with 4% water, residual water after SCM conversion would be 0.9%.

As discovered by Slade, U.S. Pat. No. 3,545,988, dry batch which has been treated by exposure to atmospheres with high humidity will transform SCA into SCM as a coating on the silica sand grains. The resulting treated batch exhibits substantially less dust generation during handling processes and in the furnace than untreated batch.

As discovered by Delling, U.S. Pat. No. 5,759,507, light soda ash which has been hydrated to form sodium carbonate monohydrate will exhibit improved handling properties, such as increased density and elimination of fine particles that lead to dusting while handling. He further finds that such SCM maintains its improved handling properties even after the SCM had been dehydrated by heating to temperature above 109° C.

The present inventor has made the discovery that batch which has been treated as described above also exhibits more rapid melting in the glass furnace than untreated batch. It is postulated that the SCM coating on the silica sand grains improves the rate of fluxing action for melting of the silica. Soda ash melts at lower temperature than silica, and molten soda ash will serve as flux to melt the silica at lower temperature than pure silica will melt.

Where the glass sample comprises post-consumer recycled cullet, organic fumes and aerosols will be released upon heating the sample in the chamber. In some embodiments, these components may be oxidized such as by combining them with glass furnace exhaust gases that are at a temperature effective for oxidizing them. This combined stream may be used as the inlet gases 35 to the indirect heat exchanger.

A preferred embodiment is now described with reference to FIG. 1. Wet batch 1 from a mixer may be carried on conveyor 2 for ultimate delivery to silo 13. Factory cullet 7 may be delivered from crusher 6 to silo 5. In certain embodiments, the cullet may be crushed so the largest dimension of any piece is less than 25 mm. Crushed factory cullet 4 may be fed onto conveyor 2 and blended with batch 1. Post-Consumer Recycle cullet 11 may be delivered to silo 9 from crusher 10 where cullet is crushed so the largest dimension of any piece is less than 25 mm. Crushed Post-Consumer Recycle cullet 8 may be fed onto conveyor 2 and blended with batch 1 and factory cullet 4 to create mixture 12. Mixture 12 may be delivered to silo 13 where it may be stored for feed into the rotary heat exchanger 14. Those skilled in the art will appreciate that other configurations are within the scope of the embodiments disclosed herein; it being preferred that ultimately a mixture of wet batch and/or cullet and/or Post-Consumer Recycle cullet is formed with the cullet, if present, having a suitable size, preferably a largest dimension less than about 25 mm.

Figure 2:
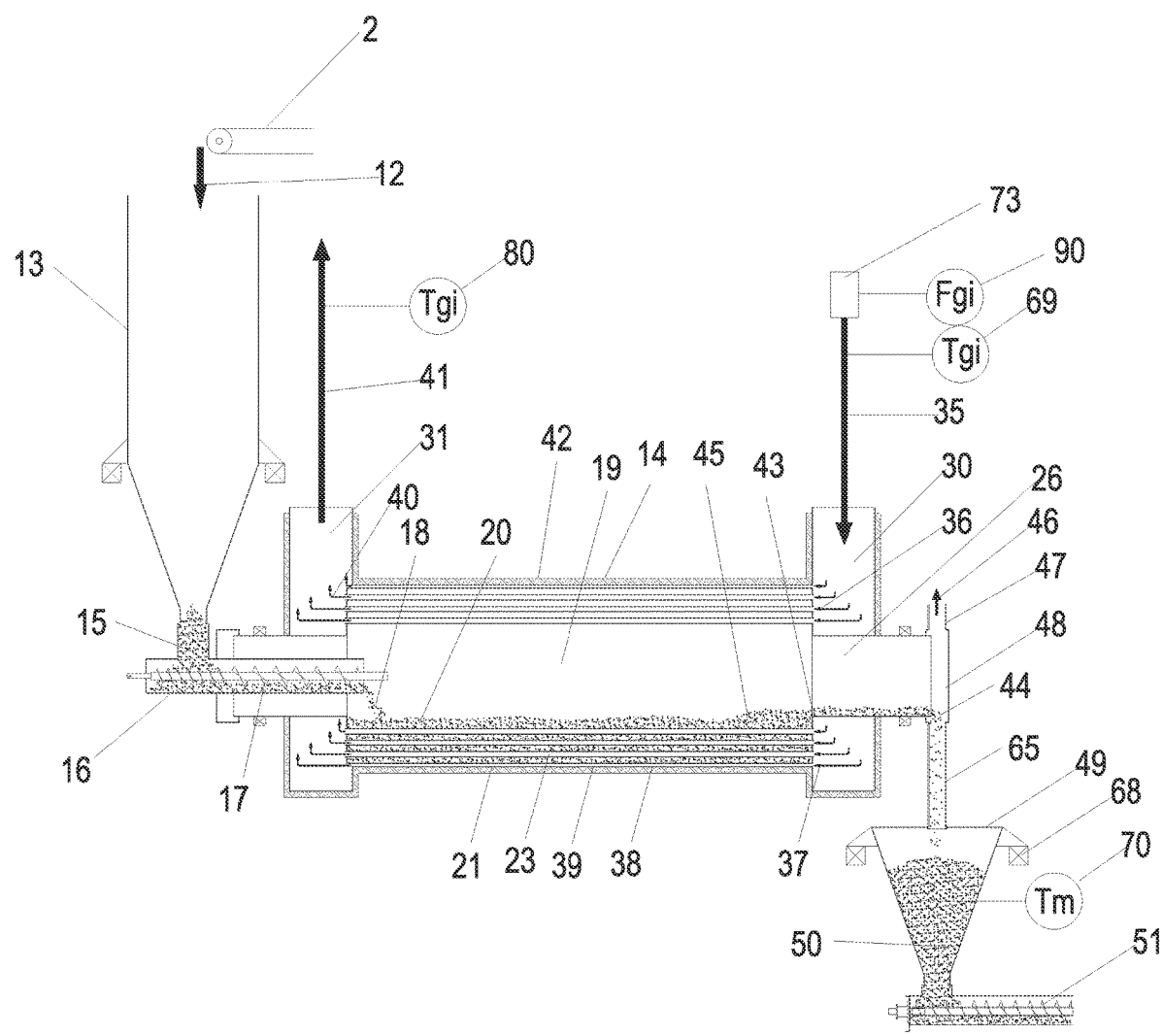
FIG. 2 is a cross-sectional view of the interior of the preferred embodiment of the rotary heat exchanger.

With reference to FIG. 2, in some embodiments feed mixture 12 may be delivered to an inlet 15 of a feed screw housing 16. The screw auger 17 may be equipped with a motor drive, not shown, and is rotated to feed mixture 12 into a rotatable or rotating drum chamber 19. Mixture material free falls at 18 from the feed screw onto the surface of the moving bed of glass sample material (which may include batch, and/or cullet and/or Post-Consumer Recycle cullet) 20 inside the rotating drum chamber 19. Suitable rotational speeds of the screw auger 17 can be determined by those skilled in the art to achieve the desired infeed rate; the rotational speed of the infeed screw auger 17 will determine the mixture throughput of the device. The drum chamber 19 is configured so the mixture inside forms a moving bed 20 of the mixture material.

Figure 3:
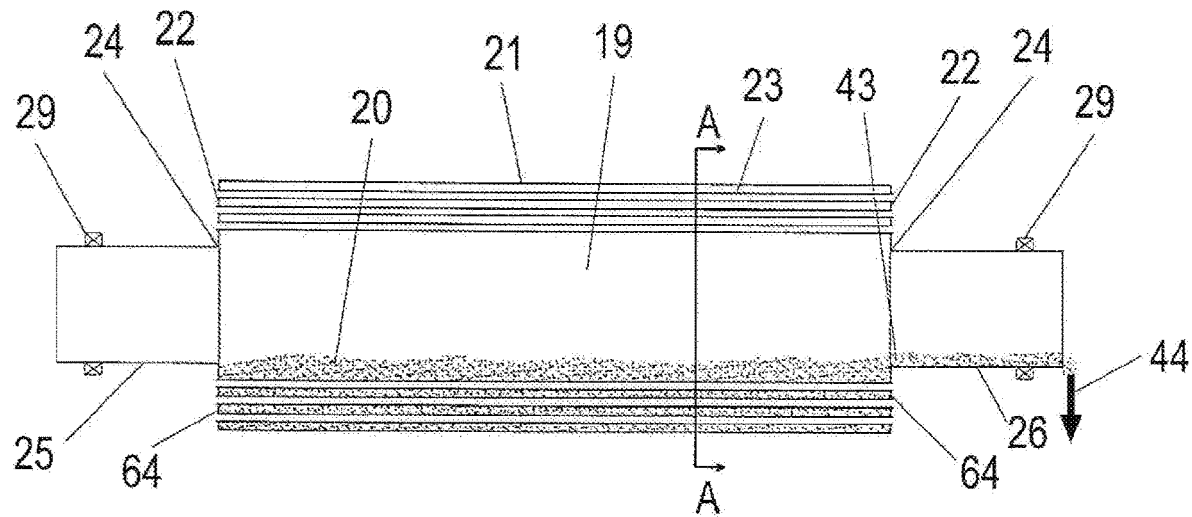
FIG. 3 is a cross-sectional view of the interior of the rotating portion of the preferred embodiment of the rotary heat exchanger.
Figure 4:
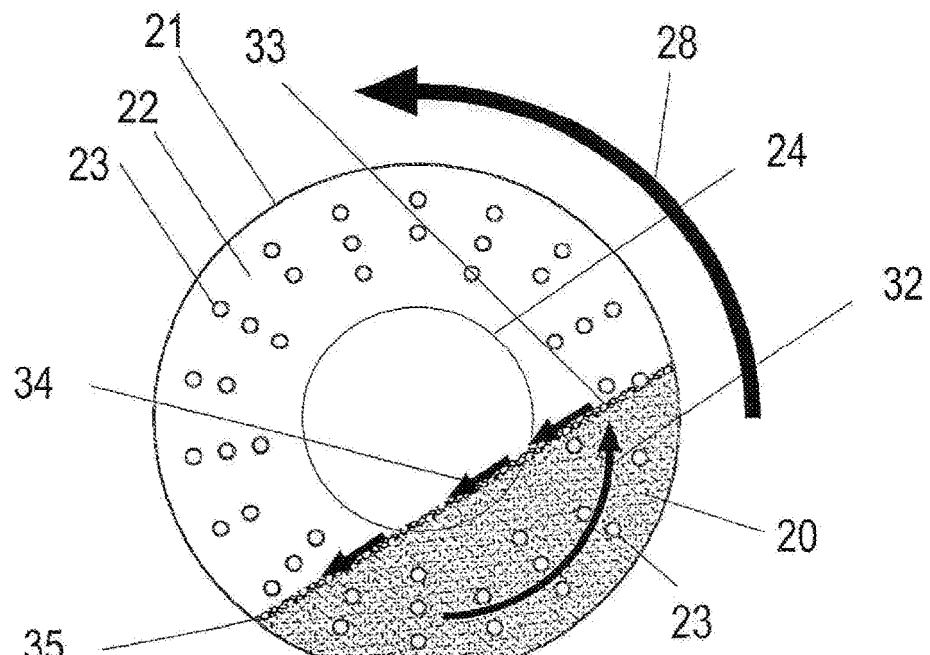
FIG. 4 is an orthogonal cross-sectional view of the interior of the rotating portion of the preferred embodiment of the rotary heat exchanger.

An embodiment of the rotating or rotatable drum chamber 19 is depicted alone in FIG. 3. FIG. 4 is a cross sectional view of the rotating drum chamber 19 of FIG. 3. In the embodiment shown, the drum chamber 19 is positioned in the space inside of a cylindrical shell 21 and may include tube sheet plates 22 at either end. One or more tubes 23, preferably a plurality of tubes 23, are configured to be connected to the tube sheet plates and span the length of the rotating drum chamber 19. Each tube sheet 22 includes a plurality of holes aligned with each tube 23 and attached to each tube 23. Each tube sheet 22 also includes a preferably centrally located hole 24 with attached supporting cylinders, the inlet cylinder 25 and outlet cylinder 26. At start-up, the rotating drum chamber 19 is partially filled with mixture material to form the moving bed 20 so that some of the tubes 23 are covered with mixture material in the moving bed. The chamber 19 is rotated with respect to the cylindrical shell 21 as depicted by arrow 28 by a motor and drive, not shown. The rotating assembly is supported by the inlet cylinder 25 and outlet cylinder 26. These cylinders may be journaled at 29, with the journaling supported on rollers (not shown). The journaling 29 is configured to be outside of the inlet 30 and outlet 31 gas plenums. As the drum chamber 19 is rotated in the direction of arrow 28, mixture material 20 is carried with the rotation as shown by arrow 32. When the top surface 33 of the moving bed 20 reaches the material's angle of repose (the angle at which the material on the slope face is on the verge of sliding), the individual grains of mixture material will slide (e.g., at 34) over the surface 33 down to the lower end 35 of the surface 33. In this way, the mixture material is constantly being contacted with the tubes 23 and the individual grains of mixture material are mixed several times for each rotation of the drum 19.

Returning to FIG. 2, in some embodiments hot furnace exhaust gases 35 enter a gas inlet plenum 30 and then flow in the direction of arrows 36 in parallel through all the tubes 23. Hot furnace exhaust gases 35 also flow in the direction of arrows 37 through a gap 38 between the drum shell 21 and gas plenum shell 39. Gases exit (as shown by arrows 40) the tubes 23 and gap 38 into an outlet plenum 31 and are discharged in the direction of arrow 41 from the device. The flowing hot gases heat the surfaces of the gas tubes 23 and drum shell 21. These hot surfaces, made of a heat conductive material such as metal, are in contact with the mixture material 20 inside the drum chamber 19 and heat the material. Heat is transferred from the flowing hot furnace gases 35 to the mixture material 20 as it travels through the drum chamber 19. The outside surfaces of the gas plenums 30, 31 and shell 39 may be covered with insulation 42 to minimize or prevent heat losses in the overall system.

As infeed material is fed into the chamber and free falls at 18, the top level 45 of moving bed 20 rises until material spills over at 43 into the outlet cylinder 26. It travels along the bottom of outlet cylinder 26 until it drops off at 44 the end of the cylinder. In steady state, the amount of material exiting the device at 44 will equal the amount of material infeed 18 and the position or height of top level 45 will remain constant. To promote material flow along the axis of the device, the axis may be tilted to horizontal, for example at an angle of 4 degrees. Typically, this tilt may be between 1 and 5 degrees.

As infeed material at initial temperature (e.g., ambient temperature or 20° C., for example) is heated in the device, the heat input first provides for sensible heating of the wet material, up to temperature 100° C. After the wet material is heated to 100° C., additional heat input is used for the latent heat of water evaporation and water vapor is created inside drum chamber 19. As operation of the process continues, water vapor is continually formed inside of the drum chamber, building pressure inside. Discharge plenum 48 in communication with the drum chamber 19 serves to collect the discharged material mixture 44 and direct it to hopper 49 such as through chute 65. This plenum 48 may be sealed to discharge cylinder 26 and to hopper 49 to prevent air infiltration or leakage out of water vapor. The pressure generated by creation of water vapor causes water vapor 46 (or steam) to be vented from the port 47 of plenum 48.

After the water is evaporated from the moving bed material 20 in drum chamber 19, heat transferred from flowing hot gases 35 will provide sensible heat to the material 20 and the temperature of material 20 will increase. As the temperature of material 20 increases, impurities from the Post-Consumer Recycle cullet, if present, in the material will volatilize, creating organic fumes and aerosols. The organic fumes and aerosols will accumulate inside drum chamber 19 and be vented at 46 along with water vapor out of port 47. If material 20 is heated to greater than about 300° C., virtually all the organic impurities in the Post-Consumer Recycle cullet will be volatilized into organic fumes and aerosols and the heated material mixture 50 fed into the furnace will be essentially free of organic impurities.

Water vapor and any organic fumes and aerosols formed as described above occupy the drum chamber 19. Some small amounts of air may inadvertently infiltrate into chamber 19 but the resulting atmosphere in 19 will in general have high relative humidity. If the relative humidity is greater than 72% then water vapor will react with the SCA in the batch to form SCM. The reaction is exothermic and provides additional heat to the material mixture 20. Depending on the balance between amounts of SCA and water in the batch, most if not all the liquid water can be converted to SCM in the device and all the SCA can be converted to SCM.

As described earlier, this recrystallization of SCA to SCM has at least two significant benefits to the glass furnace process:
1. Subsequent handling of the batch will exhibit significantly reduced dust generation.
2. Subsequent melting of the batch will require shorter melting time and reduced melting energy.

As the material mixture travels farther downstream in the drum chamber 19, its temperature increases further. When the temperature exceeds 109° C. the SCM will begin to dehydrate, releasing the water molecule to form SCA and water vapor. This water vapor may be vented 46 out of the device through the discharge plenum port 47. The advantageous material properties from recrystallization to SCM will be maintained, even after the SCM is dehydrated.

The heated mixture material 50 in hopper 49 is fed into the furnace 52 (FIG. 1) by any suitable charger, such as via a charging device 51. Typical charging devices can be screw feeders, vibrating feeders, or mechanical pusher bars. The rotary heat exchanger is preferably operated so that hopper 49 always contains some material. This maintains the pressure seal of plenum 48 and assures that the heated mixture material 50 is always available for feed into the furnace 52.

In the embodiment of FIG. 1, furnace 52 may be fired with a fossil fuel, typically natural gas, but sometimes oil, in burners (not shown). Nominally pure oxygen is used for the combustion, so the furnace is an oxyfuel furnace. Products of this combustion may be exhausted at 53 out of port 54 and flow into flue channel 55. These gases are at a high temperature, typically between 1350° C. and 1450° C., and contain oxygen at a concentration of about 2%. The oxygen content in the exhaust gases may be controlled by the amount of oxygen delivered to the burner and may be controlled to assure good combustion of the fossil fuel in the furnace, as can be determined by those skilled in the art.

Organic fumes and aerosols carried in water vapor 46 should not be discharged directly into the plant nor to atmosphere because they would result in air pollution, noxious odor and health hazard. Normally, these would be treated in a conventional air pollution control device, such as a scrubber, before being discharged to atmosphere. Instead, they may be vented from the indirect heat exchanger 14, conveyed such as inside a pipe 71, and introduced at 56 into the flue channel 55. Fan 62 may be used to provide the motive force to convey the water vapor with organic fumes and aerosols through the pipe or the like. In flue channel 55, they are blended with furnace exhaust gases 53 to form blended gases 57. The mass flow rate of water vapor with organic fumes and aerosols is typically less than 10% of the mass flow rate of exhaust gases 53 from the furnace. Exhaust gases 53 are typically at temperature 1350° C.-1450° C. Blended gases 57 are at high temperature, usually greater than about 1200° C. At this temperature and with oxygen content of 2%, the organic fumes and aerosols will be oxidized to form $CO_2$ and water vapor. Care should be taken to prevent infiltration of tramp air into the injected gases 56. Too much tramp air would decrease the temperature of blended gases 57. If this temperature were to drop below 800° C., the oxidation of organic fumes and aerosols would be poor.

Figure 8:
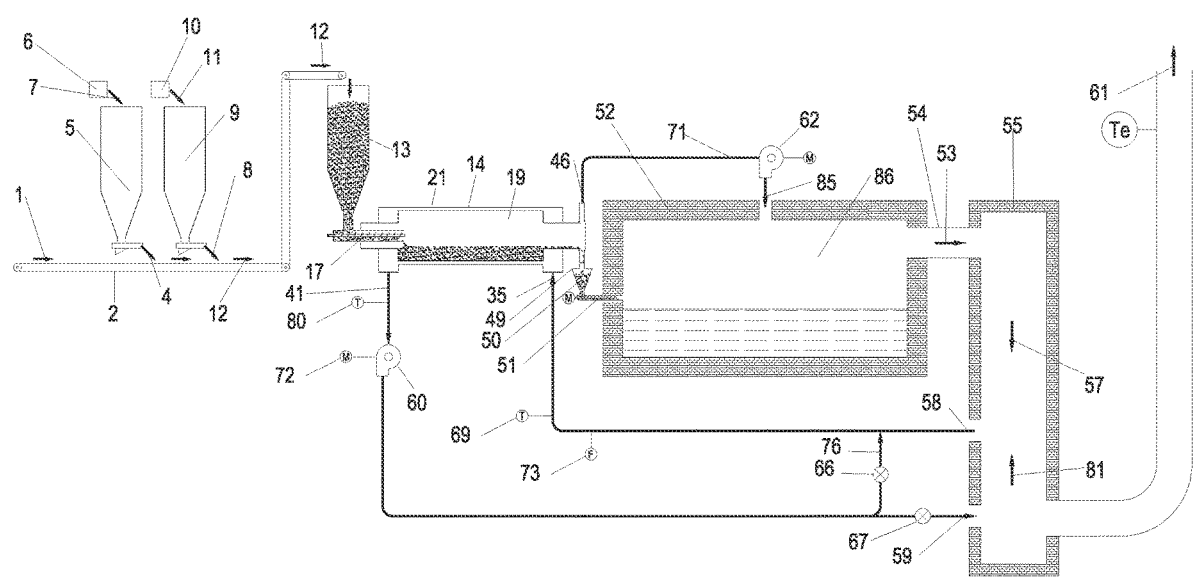
FIG. 8 is a flow diagram of an alternate embodiment of the method for producing melted glass using the batch and cullet preheater.

In the alternate embodiment of FIG. 8, the organic fumes and aerosols carried in vented water vapor 46 can be directed to flow directly into the combustion space 86 of the furnace through port 85. This embodiment achieves incineration of the organic material inside the furnace combustion space instead of in the flue channel. Furnace exhaust gases and products of oxidation of organic fumes are then directed to flow 53 out of the furnace through port 54. The remainder of the method is unchanged.

Blended gases 57 travel through flue channel 55. A majority of the blended gases are drawn at 58 out of the flue channel and become the inlet gases 35 to the indirect heat exchanger 14. Heat exchanger 14 outlet gases 41 are introduced at 59 back into the flue channel 55. Fan 60 may be used to provide the motive force to draw gases 58 from the flue channel and pass them through the heat exchanger 14. Fan 60 may also be used to provide the motive force to introduce gases 59 back into the flue channel. In practice, nearly all (e.g., about 60 to about 100%, more preferably about 80 to about 95%) the furnace exhaust gases are drawn 58 out of the flue channel and directed to the heat exchanger. In this scenario, the maximum heat recovery from exhaust gases 53 is achieved. Furnace exhaust gases are finally discharged 61 to atmosphere.

For an oxyfuel fired glass furnace, temperature (measured via thermocouple Te as shown) of discharge gases 61 must normally be above 320° C. These exhaust gases contain a large amount of water vapor (greater than 50%) as well as sodium sulfate ($Na_2SO_4$) solid particulate matter and $SO_3$ gas as pollutants. At temperature below 320° C. the sodium sulfate ($Na_2SO_4$) solid particulate matter will react with $SO_3$ gas and water vapor to form liquid sodium bisulfate ($NaHSO_4$). This liquid substance will foul any downstream dust filtration equipment.

It is desired to preheat the batch and cullet mixture to as high a temperature as possible to achieve maximum benefit to the glass melting process. The present inventor has discovered that temperature greater than 520° C. can cause the material mixture to begin to fuse together. Preferably this is then set as a high limit on material preheat temperature.

Material mixture throughput in the heat exchanger 14 will be determined by the speed of screw auger 17. This may be controlled to maintain a supply of material 50 in hopper 49. In some embodiments, hopper 49 may be mounted on one or more load cells 68 or the like to measure the weight of its contents (FIG. 2). The screw auger speed may be automatically adjusted to maintain constant weight in hopper 49 in response to the sensed weight from the load cell(s) 68. Essentially, screw auger 17 speed may be controlled so the material mass flow rate matches the demand of material from the furnace as determined by charging machine 51. A set point for weight of hopper 49 with contents will be determined by the operator to correspond to a partially filled hopper. If the weight measured by the load cells deviates below the set point, screw auger 17 speed will be increased. If the weight deviates above the set point, screw auger 17 speed will be decreased. Conventional control algorithms termed PID (Proportional Integral Derivative) control can be utilized so as to achieve an essentially constant screw speed with only minor and slow speed adjustments required. Manual adjustment of screw auger speed alternatively may be used.

For an oxyfuel furnace, Qg is defined as the sensible heat contained in the exhaust gases 53 between their temperature at port 54 and 320° C. Equipment such as the flue channel, ducting, rotary heat exchanger and fan may be insulated to minimize heat losses, but there will always be parasitic heat losses, Qp from the equipment. The total heat available for preheating the batch and cullet mixture is Qa, where:

$$Qa = Qg - Qp$$

This available heat can be used for sensible heating of the batch and cullet mixture and latent and sensible heat for evaporation and heating of the water contained in the material. For typical oxyfuel fired glass furnaces, if all the available heat, Qa, were to be used for batch and cullet preheating, the batch and cullet mixture could be heated to a temperature between 450° C. and 500° C. Exact calculation depends on the detail design of the furnace, equipment, and flue channel. The conclusion can be made that usually there is not enough heat available to preheat the batch and cullet mixture up to the material high limit of 520° C. From the perspective of heat availability, the optimum design of a system will be obtained when the discharged exhaust gases 61 are at 320° C., that is when all the heat available in the exhaust gases has been transferred to the batch and cullet.

The temperature 70 of outlet 50 material mixture (FIG. 2) will depend on the mechanical design of the rotary drum heat exchanger, the throughput of material mixture, the gas 35 flow volume in the heat exchanger 14, and the temperature 69 of the inlet 35 gases. In general, it will be desired to provide inlet temperature 69 as high as possible. The critical issue is the batch and cullet mixture high temperature limit of 520° C. During operation the temperature of tube 23 will be between the gas inlet temperature 69 and the material outlet temperature 70. If the temperature of tube 23 exceeds the material limit of 520° C., the material will stick to the tube. For example, with material preheat temperature of 425° C. and gas inlet temperature of 650° C., the tube temperature might be 465° C. If the material were to be heated to 490° C., the tube temperature might be 520° C., and sticking would occur. Such sticking would render the heat exchanger 14 non-functional. Because of this effect, the practical limit of material preheat in this device may be about 450° C.

Since the mechanical design will be determined in advance by the designer and the material throughput will be determined by the furnace operation, only the gas 35 flow volume 73 and temperature 69 can be varied and controlled in real time. The heat transfer rate from gas to material will increase as both the temperature 69 and volume 73 are increased. As temperature 69 increases the temperature difference between gas and material increases, thus increasing the heat transfer rate. As flow 73 increases, the gas flow velocity inside tubes 23 increases. As velocity increases, the heat transfer rate from the flowing gases to the tube wall increases.

The temperature 69 will have a high limit as imposed by material sticking to the tube 23 wall. Therefore, the system operation will be optimum when temperature 69 is at this limit. Practical experience is that this limit will be between 600 and 650° C.

As flow 73 increases, the flow of gases 58 drawn from the flue also increase. Eventually flow of gases 58 will reach a critical point where they equal the flow of gases 57 in the flue. If flow 73 is increased further, gases 58 will be comprised of all of 57 plus some of the gases 59 downstream of valve 67 being returned to the flue. These gases 59 will actually flow upward 81 in the flue, resulting in many deleterious effects, most importantly loss of furnace pressure control. At this critical point, the temperature of gases 58 will decrease and 69 will also decrease. The operator will learn from experience what the maximum flow 73 will be before this critical point is reached. Set point of 73 will then be a safe margin below the critical point.

A unique exhaust gas handling arrangement may be used and permits independent control of these two parameters to achieve controlled operation of the system, including:

Valve 66 which allows a portion of outlet gas 41 flow from the heat exchange tube(s) in the drum chamber 19 to be blended with gases 58 withdrawn from the flue channel. It may be provided with an actuator (not shown) to allow the valve position to be adjusted and controlled automatically. The valve also may be controlled manually. The proportion of each blended gas stream will determine the inlet gas temperature Tgi 69. For example, 31300 Nm³/h of extracted gases 58 at temperature of 1200° C. would combine with 65900 Nm³/h of recycled gases 76 at temperature 400° C. to produce 97300 Nm³/h of mixture 35 at temperature of 650° C. inlet to the heat exchanger 14.

A driving force such as fan 60 which may be provided with a motor 72 with variable speed drive, allowing the flow rate of the fan to be adjusted and controlled.

Exhaust gas 35 flow rate 90 will be measured by flow measurement device 73, such as a pitot tube.

Temperature of inlet gases may be measured directly such as by a thermocouple 69.

Temperature of outlet gases 41 may be measured by thermocouple 80.

Temperature of material outlet may be measured directly by thermocouple 70.

Figure 10:
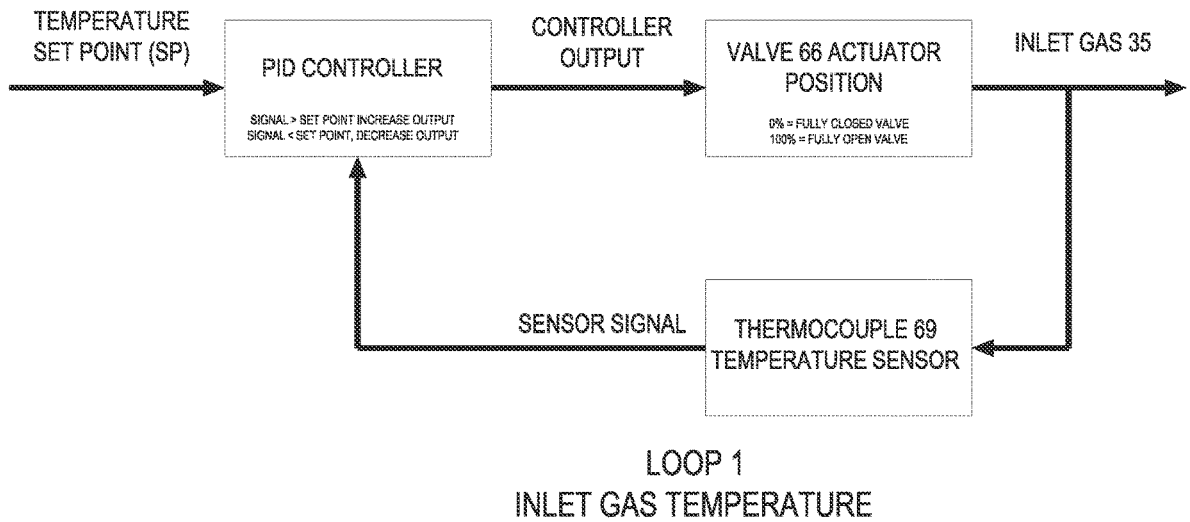
FIG. 10 is a flow chart of the control system for inlet gas temperature and flow volume in accordance with certain embodiments.
Figure 10:
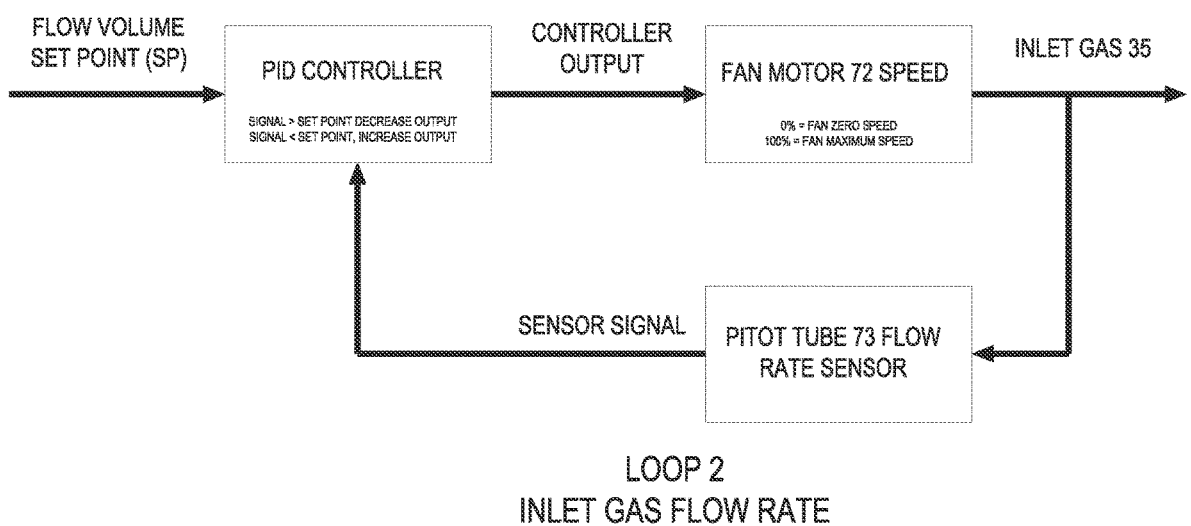

The control system may include two control loops, as shown in FIG. 10:

Loop 1—Temperature 69 of inlet gases 35 is used as the control variable to automate valve 66 with a PID control algorithm. The operator may input the set point for temperature 69, valve 66 actuates via a PID controller to obtain set point of 69. If actual temperature is below the set point, valve 66 closes. If the actual temperature is above the set point, valve 66 opens.

Loop 2—Pitot tube 73 measures flow volume 90 of 35. Flow volume 90 is then used as the control variable to automate the speed control of fan motor 72 via a PID control algorithm.

If discharge gas temperature 80 drops too low, the heat exchanger 14 is transferring too much heat to the material. As described previously, exhaust gas temperature 61 must not be lower than 320° C. If this happens, the inlet gas temperature 69 set point will be decreased so lower material preheat temperatures 70 are achieved. The operator may increment inlet gas temperature 69 lower until the 320° C. temperature low limit of 61 is achieved. This may be carried out manually or automatically with the controller.

Figure 9:
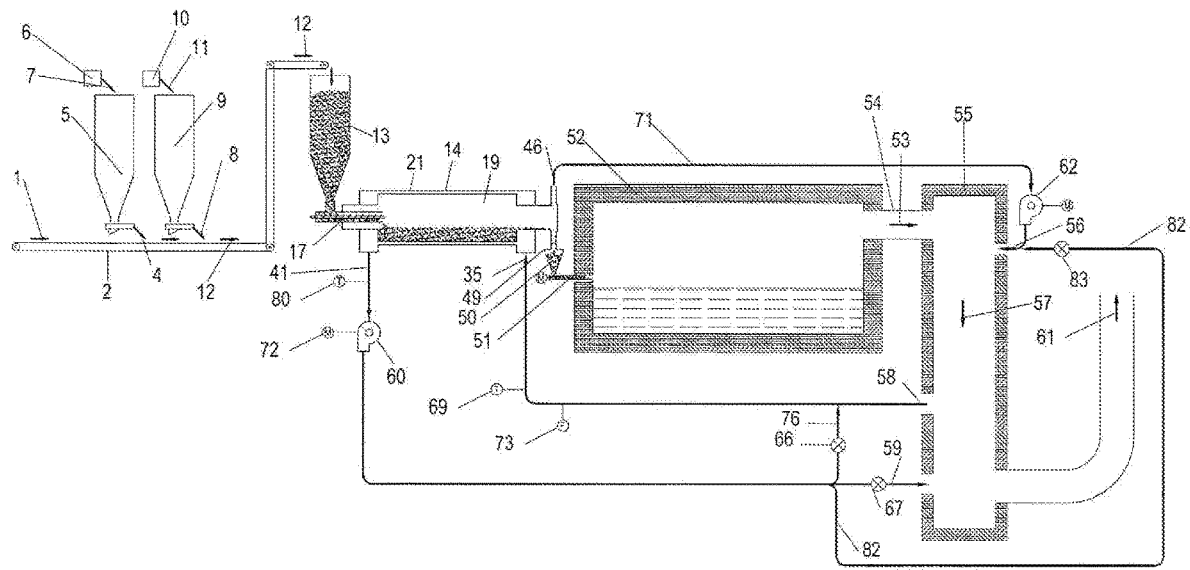
FIG. 9 is a flow diagram of an alternate embodiment of the method for producing melted glass using the batch and cullet preheater.

In the alternate embodiment shown in FIG. 9, some of the heat exchanger outlet gases 41 from the fan 60 are now directed to flow into the top of the flue channel through port 56 along with the vented gases 71 from the heat exchanger 14, as shown at 82. In this scenario, the temperature of blended gases 57 will be reduced from the preferred embodiment of FIG. 1. This temperature can be controlled by varying the amount of gases 82 by using control valve 83. The oxidation of organic material in blended gases 57 will be maintained so long as temperature of blended gases 57 remains above 800° C. Such a ducting arrangement does not alter the function of the preferred embodiment but may result in more convenient duct arrangements.

Figure 5A:
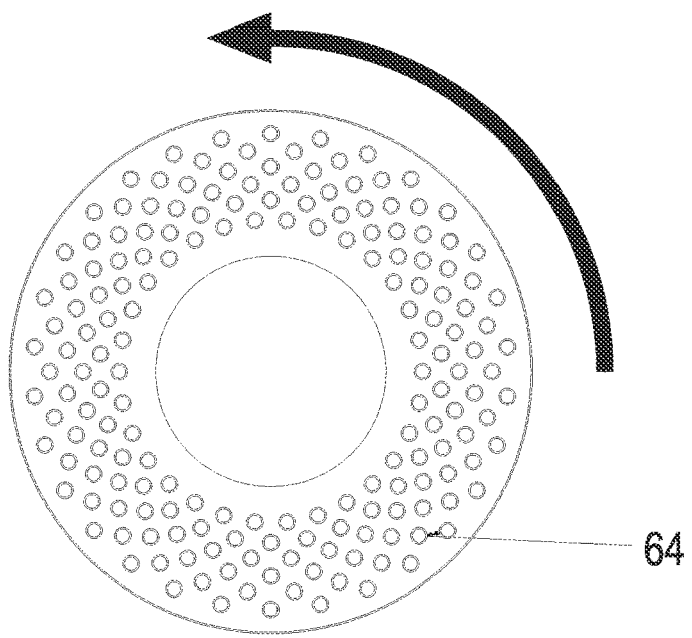
FIG. 5A is an orthogonal cross-sectional view of the interior of the rotating portion of the preferred embodiment in configuration enabled by the addition of fine cullet crushing.
Figure 5B:
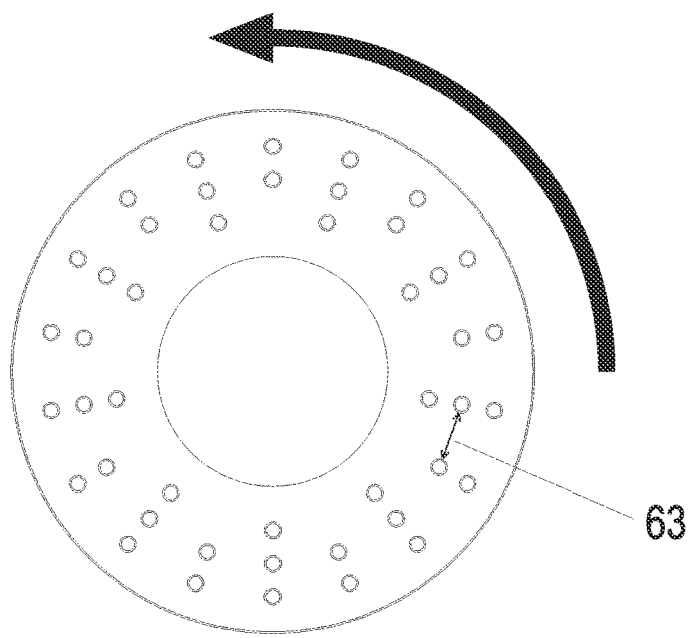
FIG. 5B is an orthogonal cross-sectional view of the interior of the rotating portion of the preferred embodiment in configuration with conventional cullet crushing.

FIG. 5B shows a cross-sectional view of the rotating drum 19 in a configuration for a conventional glass melting process. Post-Consumer Recycle cullet and factory cullet are normally crushed to size so that individual pieces of cullet can have dimensions up to 100 mm. As such, the minimum distance 63 between tubes 23 must be 200 mm to prevent cullet pieces from becoming permanently jammed between tubes. The drum includes 52 tubes.

FIG. 5A shows the cross-sectional view of the rotating drum 19 in a configuration for an improved rotating drum design. Now, Post-Consumer Recycle cullet and factory cullet are crushed to size so that individual pieces of cullet have dimensions up to 25 mm, and thus the minimum distance 64 between tubes 23 can be reduced to 50 mm and cullet pieces will not become jammed between tubes. The drum 19 in this embodiment include 180 tubes.

The maximum material throughput of rotary heat exchanger 14 is determined by the amount of heat transfer surface area afforded by the tubes 23. If the rotating drum 19 configurations of FIG. 5B and FIG. 5A have the same diameter and length, the configuration of FIG. 5A will have 3.5 times more heat transfer surface area than FIG. 5B because it has 3.5 times as many tubes. Thus, the configuration of FIG. 5A will have throughput capacity 3.5 times that of FIG. 5B. Configuration of FIG. 5A is enabled by crushing the cullet to size dimension less than 25 mm. For a given material throughput capacity specification, the rotary heat exchanger 14 with cullet crushing to 25 mm will be substantially less expensive and smaller than that with conventional cullet crushing.

Figure 6:
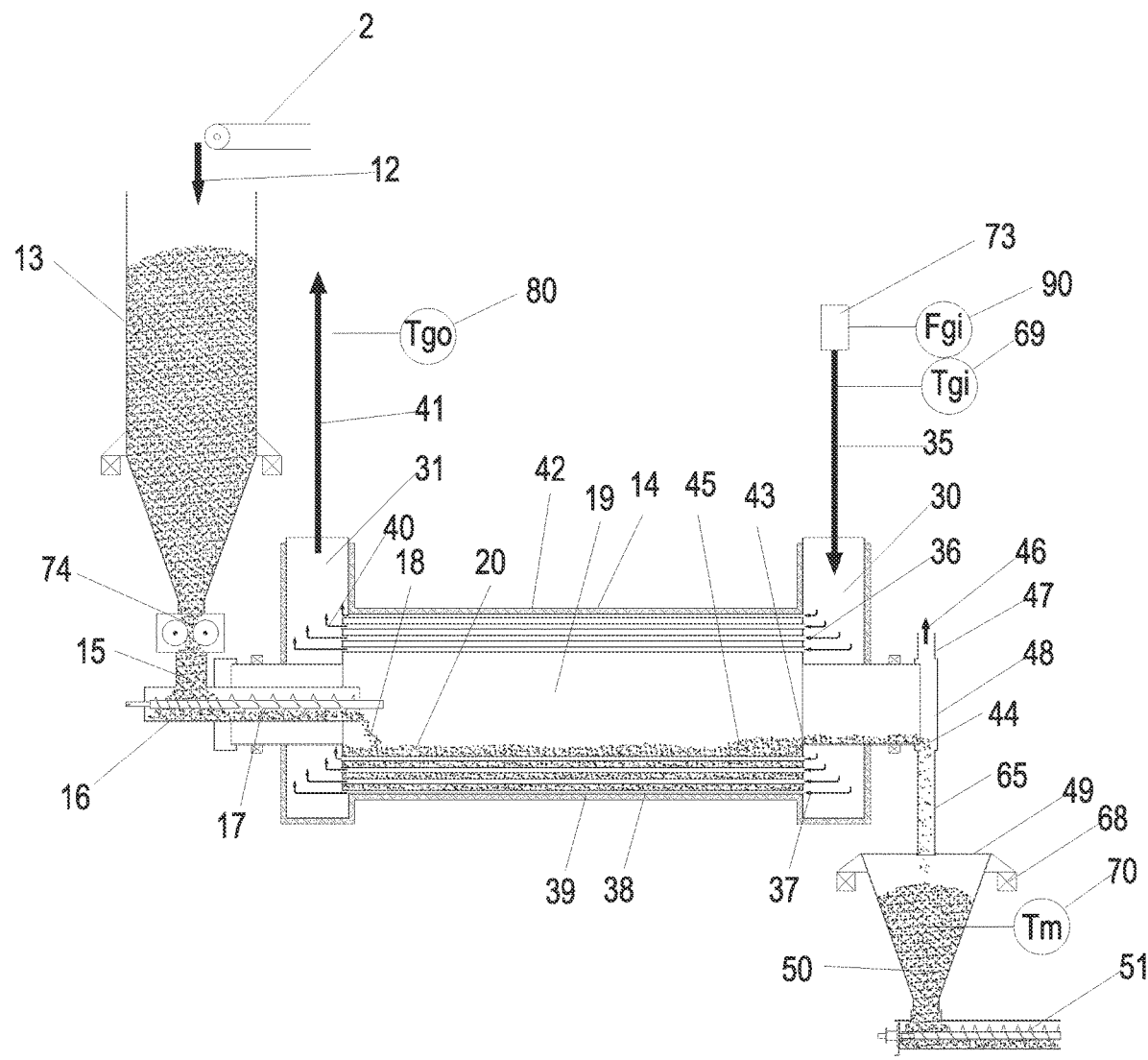
FIG. 6 is a flow diagram of an alternate embodiment of the method for producing melted glass using the batch and cullet preheater.

An alternative embodiment is shown in FIG. 6. A crusher 74 is positioned between the silo 13 and screw auger 16. Crusher 74 is operated continuously and serves to reduce the maximum size of cullet in mixture 12 delivered to silo 13 to be less than 15 mm. Generally, the maximum size can is determined by the spacing between the crushing members of 74. With this size cullet, the spacing 64 between tubes can be made to be 30 mm with a corresponding increase in number of tubes provided. With this smaller size, distance between tube 64 can now be made to be 30 mm, with corresponding increase in number of tubes in the device of FIG. 5A to 280. This results in 56% increase in heat transfer surface area compared to device of FIG. 5A. Using this additional crusher enables the equipment to be retrofit into existing plants where the cullet crushing equipment is already installed and produces cullet sizes too large for the rotary batch preheater. Other ways to crush the cullet may be used to decrease the size to less than 15 mm.

Figure 7:
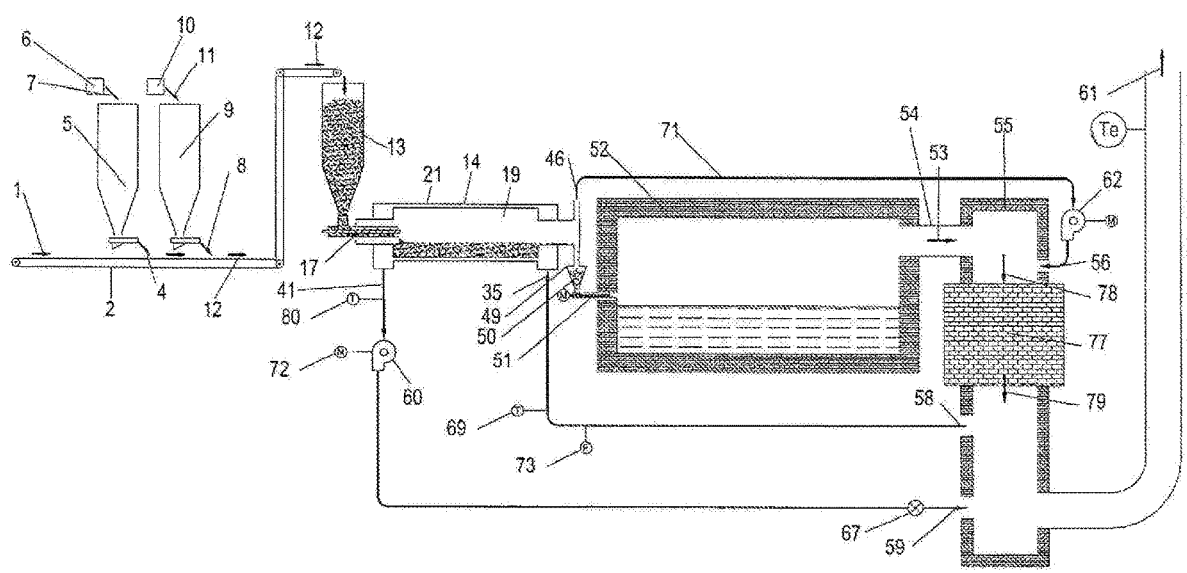
FIG. 7 is a flow diagram of the method for producing melted glass using the batch and cullet preheater as applied to a regenerative air-fuel fired furnace.

In the alternate embodiment of FIG. 7, furnace 52 may be fired with a fossil fuel, typically natural gas, but sometimes oil, in burners (not shown). Air is used for the combustion, so the furnace is an air-fuel furnace. Air fuel furnaces are typically provided with a regenerative heat exchanger 77 that preheats the combustion air using furnace exhaust gases. Products of this combustion may be exhausted at 53 out of port 54 and flow into flue channel 55. These gases are at a high temperature, typically between 1350° C. and 1450° C., and contain oxygen at a concentration of about 2%. The oxygen content in the exhaust gases may be controlled by the amount of oxygen delivered to the burner and may be controlled to assure good combustion of the fossil fuel in the furnace, as can be determined by those skilled in the art.

From the flue channel 55, exhaust gases 78 flow into the regenerator 77 where they are cooled by heat exchange to the combustion air (not shown). Exhaust gases 79 leaving the regenerator are typically at temperature of 500° to 550° C. In this embodiment, the exhaust gases 58 are comprised of the regenerator outlet gases 79. These are drawn through the heat exchanger 14 by fan 60 and returned to the exhaust gas handling channel 59 where they comprise the exhaust gases discharged to atmosphere 61. In this configuration, the temperature 69 and flow rate 73 of gases inlet to the heat exchanger 14 will be determined by the operation of the furnace 52 and regenerator 77, In this embodiment, the organic fumes and aerosols carried in water vapor 46 may be vented from the indirect heat exchanger 14, conveyed such as inside a pipe 71, and introduced at 56 into the flue channel 55. Fan 62 may be used to provide the motive force to convey the water vapor with organic fumes and aerosols through the pipe or the like. In flue channel 55, they are blended with furnace exhaust gases 53 to form blended gases 57. The mass flow rate of water vapor with organic fumes and aerosols is typically less than 10% the mass flow rate of exhaust gases 53 from the furnace. Exhaust gases 53 are typically at temperature 1350° C.-1450° C. At this temperature and with oxygen content of 2%, the organic fumes and aerosols will be oxidized to form $CO_2$ and water vapor.

EXAMPLE

Typical system operation is described below.

A rotary heat exchanger with rotating chamber is fitted with 204 tubes. Tubes are 60 mm diameter and 3650 mm long. Distance between adjacent tubes is typically 30 mm. Such a device presents 142 square meters of heat transfer area associated with the tubes. The rotary heat exchanger is inclined at an angle of 3° to the horizontal to facilitate batch movement. The chamber rotates at 5 rotations per minute. The rotating chamber is enclosed by a fixed casing with exhaust gas inlet at one end and an exhaust gas outlet at the other end.

4500 kg/h of wet batch (with 3% moisture) at temperature 20° C. and 4500 kg/h of wet post-consumer recycle (PCR) cullet (with 3% moisture) is blended to form a mixture and delivered to a storage hopper. The PCR cullet contains 1% organic impurities, equivalent to 45 kg/h. The mixture is fed out of the storage hopper and passed through a crusher where the maximum size piece is reduced to less than 15 mm.

The mixture is then fed into the chamber by a screw feeder.

The mixture is heated in the rotary heat exchanger and then fed into the glass melting furnace. The glass melting furnace is of oxy-fuel design, where 1190 Nm/h of 95% pure oxygen is blended with 540 $Nm^3$/h of natural gas in the furnace combustion space and burned to generate heat for the melting process. 2435 $Nm^3$/h of furnace gases at 1400° C. are exhausted from the furnace into the flue channel at temperature.

270 kg/h of water vapor and 45 kg/h of volatilized organic matter are generated inside the rotating chamber and are vented out through a port. These comprise 390 Nm³/h of vented gases at 300° C. and are directed to the top of flue channel where they are mixed with the furnace exhaust gases. After mixing, the combined gas flow is 2825 Nm³/h at 1270° C. Because the furnace exhaust gases contain 2% oxygen, the combined temperature of 1270° C. is sufficient to oxidize 100% of the organic matter into $CO_2$ and $H_2O$. This prevents any discharge of organic material to atmosphere.

Further down the flue channel, 2825 Nm³/h of combined gases at 1270° C. are extracted and then blended with 3050 Nm³/h of outlet gases from the rotary heat exchanger to produce 5075 Nm³/h of blended inlet gases at 650° C. to the rotary heat exchanger. The 5075 Nm³/h of rotary heat exchanger outlet gases are drawn through the heat exchanger by a fan. The inlet duct to the heat exchanger is equipped with a flow measurement device. The fan speed is controlled via a PID control loop to maintain inlet gas flow volume at 5075 Nm³/h. The gases discharged from the fan are divided into two portions as controlled by valves in the ducting. The inlet duct to the heat exchanger is equipped with a temperature sensor, this temperature being used by a PID control loop driving the position of the aforementioned valves so the necessary quantity of fan outlet gases is directed to be combined with the 2825 Nm³/h of exhaust gases drawn from the flue to obtain blended temperature of 650° C., in this case the returned gases will be 3050 Nm³/h flow volume. The remaining portion of fan outlet gases, 2025 Nm³/h at 350° C., are returned to the flue channel downstream of the extraction point and are ultimately discharged to atmosphere.

Such a system will heat the batch and cullet up to a temperature of 425° C. and reduce the furnace natural gas and oxygen consumption by 22%. Specifically, the same furnace operating without the rotary heat exchanger would consume 692 Nm/h of natural gas and 1525 Nm/h of oxygen.

The invention claimed is:

1. A method of producing molten glass, comprising:
   providing a glass melting furnace configured to melt, by burning fossil fuel, glass sample, the glass sample comprising glass batch material comprising soda ash, or cullet or post-consumer cullet, or any combination of batch material comprising soda ash, cullet and post-consumer cullet, said melting producing exhaust gas;
   introducing glass sample into a chamber of a rotary drum heat exchanger having at least one heat exchange tube;
   causing a transfer of heat from said exhaust gas in said at least one heat exchange tube to said glass sample in said chamber to volatize any organic impurities in said glass sample, heat said glass sample and evaporate water from said glass sample to dry said glass sample, said evaporated water forming water vapor in said chamber;
   discharging the dried glass sample from said rotary drum heat exchanger and introducing it into said glass melting furnace;
   combining said water vapor and any volatized organic impurities with said exhaust gas upstream of said rotary drum heat exchanger; and introducing said combined water vapor, any volatized organic impurities and said exhaust gas into said at least one heat exchanger tube.

2. The method of claim 1, wherein said glass sample comprises soda ash, and wherein said dried glass sample is contacted with said water vapor causing said soda ash in said glass sample to form sodium carbonate monohydrate.

3. The method of claim 2, wherein said transfer of heat from said exhaust gas to said glass sample is sufficient to dehydrate said sodium carbonate monohydrate.

4. The method of claim 2, wherein said transfer of heat raises the temperature of said glass sample to above 109° C.

5. The method of claim 1, wherein said glass sample comprises cullet, post-consumer cullet, or both, and wherein said method further comprising crushing said cullet and/or post-consumer cullet prior to its introduction into said chamber.

6. The method of claim 5, wherein said glass sample is crushed so that its largest dimension does not exceed 25 mm.

7. The method of claim 6, wherein there are a plurality of spaced heat exchange tubes in said rotary drum heat exchanger, and wherein the spacing between said plurality of tubes is less than 75 mm.

8. The method of claim 5, wherein said glass sample is crushed so that its largest dimension does not exceed 15 mm.

9. The method of claim 8, wherein there are a plurality of spaced heat exchange tubes in said rotary drum heat exchanger, and wherein the spacing between said plurality of tubes is less than 30 mm.

10. The method of claim 1, further comprising extracting a portion of gas in said chamber and mixing it with said exhaust gas.

11. The method of claim 1, wherein said glass batch material comprises cullet.

12. The method of claim 1, wherein said glass batch material comprises post-consumer recycle cullet.

13. The method of claim 1, further comprising providing a regenerative heat exchanger for preheating combustion air and further comprising combining said water vapor and any volatized organic impurities with said exhaust gas before it enters the regenerative heat exchanger.

14. The method of claim 1, wherein at least a portion of any volatized organic impurities are oxidized after mixing with said exhaust gas.

15. The method of claim 1, wherein said glass melting furnace is oxy-fuel fired.

16. The method of claim 15, wherein the exhaust gas has a temperature between 1350° C. and 1450° C.

* * * * *